US00RE34241E

United States Patent [19]

Jiang

[11] E Patent Number: Re. 34,241

[45] Reissued Date of Patent: May 4, 1993

[54] METHOD AND APPARATUS FOR EXTRACTING A PREDETERMINED PATTERN FROM A SERIAL BIT STREAM

[75] Inventor: Ching-Lin Jiang, Dallas, Tex.

[73] Assignee: Dallas Semiconductor Corp., Dallas, Tex.

[21] Appl. No.: 490,801

[22] Filed: Mar. 8, 1990

Related U.S. Patent Documents

Reissue of:

[64] Patent No.: 4,730,346
Issued: Mar. 8, 1988
Appl. No.: 13,911
Filed: Feb. 12, 1987

[51] Int. Cl.[5] ..... H04L 7/08

[52] U.S. Cl. ..... 375/116; 370/105

[58] Field of Search ..... 375/106, 114, 116; 370/100.1, 105, 105.1, 105.4, 106, 108; 364/715.11

[56] References Cited

U.S. PATENT DOCUMENTS 3,940,563 2/1976 Susset ..... 370/105
3,985,967 10/1976 Colton et al. ..... 370/105.1
4,002,845 1/1977 Kaul et al. ..... 375/106
4,347,606 8/1982 Hoogeveen ..... 370/105
4,397,020 8/1983 Howson ..... 370/105
4,622,666 11/1986 Graves et al. ..... 370/105
4,847,877 7/1989 Besseyre ..... 375/114

*Primary Examiner*—Benedict V. Safourek
*Attorney, Agent, or Firm*—Worsham, Forsythe, Sampels & Wooldridge

[57] ABSTRACT

An embedded framing bit pattern in a serial bit stream is located by combining the last bit to arrive of the serial bit stream with a predetermined number of prior bits of the serial bit stream which are spaced apart by the pitch of the bits of the framing bit pattern, and this combination of the bits is tested to determine if the combination matches part of the framing bit pattern. If a match does not occur, then the bits which were combined together are changed to a bit pattern that will not result in a match when these bits (except for the eldest bit which is disregarded) is combined again with a new bit of the serial bit stream, no matter what the logic state of the new bit. In this manner all of the bits, as they arrive and are combined and tested, will eventually be changed except the bits which are part of the framing bit pattern.

22 Claims, 1 Drawing Sheet

METHOD AND APPARATUS FOR EXTRACTING A PREDETERMINED PATTERN FROM A SERIAL BIT STREAM

Matter enclosed in heavy brackets [ ] appears in the original patent but forms no part of this reissue specification; matter printed in italics indicates the additions made by reissue.

TECHNICAL FIELD

This invention relates to methods for processing serial bit streams of digital data, and more particularly to methods for extracting a predetermined bit pattern from a serial bit stream.

BACKGROUND OF THE INVENTION

Digital data transmission over a relatively long distance is usually transmitted over a single transmission channel in a serial bit stream format. In this format digital data, which usually uses eight, sixteen or thirty-two bits to represent a value or character, is transmitted serially, bit by bit, so that every eighth, sixteenth or thirty-second bit respectively is part of a new value or character.

An example of the use of serial data transmission is the transmission of telephone communications which have been digitized. Long distance transmission of digital telephone communications usually involve a process of combining or multiplexing many telephone calls onto one line. Several standards have been promulgated for such multiplexed telephone transmissions, one of which is referred to as the T1 standard. Telephone communications (data) is transmitted as a serial bit stream at 1.544 megabits/second.

A subset of the T1 standard is the ESF standard as described in AT&T Compatibility Bulletin No. 142, "The Enhanced Superframe Format Interface Specification" dated December, 1983. In the ESF standard, the data is divided into blocks of data of 193 bits each, and the first of each fourth block contains a predetermined framing bit. These framing bits are taken from the bit pattern 001011 so that the first framing bit is a 0 (zero) at the beginning of the fourth block, the second framing bit (at the beginning of the eighth block) is also a 0, the third framing bit (at the beginning of the 12th block) is a 1 (one), the fourth framing bit (at the beginning of the 16th block) is a 0, the fifth framing bit (at the beginning of the 20th block) is a 1, and the sixth framing bit (at the beginning of the 24th block) is a 1. Then the pattern repeats so that the framing bit at the start of the 28th, 32th, 36th, 40th, 44th and 48th block is 001011 respectively.

During transmission of data using the T1 standard, a separate clock signal is not transmitted; only the serial bit stream of data is transmitted. The receiver must determine where the boundaries of each individual bit occur in order to synthesize a clock signal which will be locked in phase with the serial bit stream. Once the bit timing has been established, the position of the framing bit needs to be established in order to synchronize the receiver with the transmitter. These framing bits are embedded into the data stream to enable the receiver to perform this synchronization since all of the other bits are essentially random data to the receiver synchronization circuit.

The synchronization process examines each bit of the incoming serial data to find out if the bit is part of the framing pattern. This must be repeated 4,632 bits later to see if the same pattern occurs since there is a finite probability that the first pattern was a random data pattern rather than the framing pattern. In practice this framing pattern is constantly checked in order to verify synchronization.

Of importance in the synchronization process is the speed at which the framing pattern is identified since data is not being properly decoded until the receiver is properly in synchronization with the transmitter. Also of importance, especially when the synchronization circuitry is embodied in an integrated circuit, is the amount of circuit space required for the synchronization. The amount of circuitry required directly affects the size of the integrated circuit (or portion of the integrated circuit) needed for the synchronization.

Therefore, it can be appreciated that a synchronization method which is relatively fast and that also uses a relatively small area on an integrated circuit is highly desirable.

SUMMARY OF THE INVENTION

It is therefore an object of this invention to provide a method for synchronizing a receiver with a serial bit stream containing embedded framing bits which is relatively fast and which uses a relatively small area on an integrated circuit.

Shown in an illustrated embodiment of the invention is an apparatus for locating the position of a bit framing pattern in a serial bit stream which is received at a serial data input terminal and wherein each of the framing bits is separated by $P-1$ bits of data. K logic-storage circuits are used, each having an input terminal and an output terminal; the input terminal of the first logic-storage circuit is coupled to the serial data input terminal, the input terminal of the second logic-storage circuit is coupled to the output terminal of the first logic-storage circuit, and the rest of the remaining K logic-storage circuits are similarly connected to form a series circuit in which the Kth logic-storage circuit is the last circuit of the series circuits. Each of the K logic-storage circuits receives a logic signal at its input terminal and either sets the logic signal to a first or second logic state or leaves the logic signal unaltered in response to a comparator output signal. Each of the K logic-storage circuit also stores the altered or unaltered logic signal sequentially in P storage locations in synchronization with the rate of arrival of the serial bit stream at the serial data input terminal, and provides at the output terminal the Pth prior altered or unaltered logic signal.

A comparison circuit coupled to the serial data input terminal and to the output terminals of the K logic-storage circuits determines if the bit of the serial bit stream present at the input terminal in combination with the altered or unaltered logic signals at the output terminals of the first, second, . . . Kth logic-storage circuit respectively match any $(K+1)$-bit sequences of the pattern formed by concatenating two of the framing bit patterns and provides the comparison output signal at an output terminal indicating if a match occurs or not. If a match does not occur, the K logic-storage circuits respond to the comparison output signal by setting each of the logic signals to the first or second logic state such that the combination of a logic bit X and the altered logic signals of the first, second, . . . and Kth logic-storage circuits respectively would not match any sequence of the bit pattern formed by concatenating two of the framing patterns where logic bit X can be either a logical 1 or a logical 0. But if a match does occur, the logic signals of the K logic-storage circuits are unaffected. A counting circuit counts the number of matches which occur during successive blocks of the serial bit stream which arrive at the data input terminal, each of the blocks being P bits in length.

As also shown in an illustrated embodiment of the invention, the location of the framing bits of a framing bit pattern embedded in a serial bit stream and separated by P−1 bits of data can be determined by taking M samples $P_1, P_2, \ldots P_M$ of the serial bit stream arriving at an input terminal where $P_1$ is the last bit to have arrived, $P_2$ is the bit of the serial bit stream which arrived P bits prior to the $P_1$ bit, and $P_M$ is the bit which arrived (M−1) X P bits prior to the $P_1$ bit.

Next, it is determined if the bit pattern sequence $P_M \ldots P_1$ matches any sequence of the bit pattern formed by concatenating two of the bit framing patterns. If a match occurs, then a counter is incremented and the $P_1, P_2, \ldots P_{M-1}$ bits are changed to a bit pattern such that the combination of a logic bit X (where logic bit X can be either a logical 1 or a logical 0) and the channel $P_1, P_2 \ldots P_{M-1}$ bits would not match any sequence of the bit pattern formed by concatenating two of the framing patterns; alternatively, if a match does not occur, the bits of the serial bit stream are left unaffected. Upon arrival of the next bit of the serial bit stream at the input terminal, M samples $P_1, P_2, \ldots P_M$ are taken where $P_1$ is the last bit of the serial bit stream to have arrived at the input terminal, $P_2$ is the bit of the serial bit stream which arrived P bits prior to the $P_1$ bit unless the $P_2$ bit, when it was in the $P_1$ position, was previously changed, and $P_M$ is the bit which arrived (M−1) X P bits prior to the $P_1$ bit unless the $P_M$ bit, when it was in the $P_1, P_2, \ldots P_{M-2}$ or $P_{M-1}$ position, was previously changed. The steps of this paragraph are repeated P−1 times.

The state of the counter is examined, and if the counter is zero, the steps of the above two paragraphs are repeated. If the counter is one, then the location of the framing bits has been identified, and if the counter is more than one, the counter is reset and the steps of the previous paragraph are repeated.

BRIEF DESCRIPTION OF THE DRAWINGS

The aforementioned and other features, characteristics, advantages, and the invention in general, will be better understood from the following more detailed description taken in conjunction with the accompanying drawings in which.

DESCRIPTION OF THE PREFERRED EMBODIMENT

Figure 1:
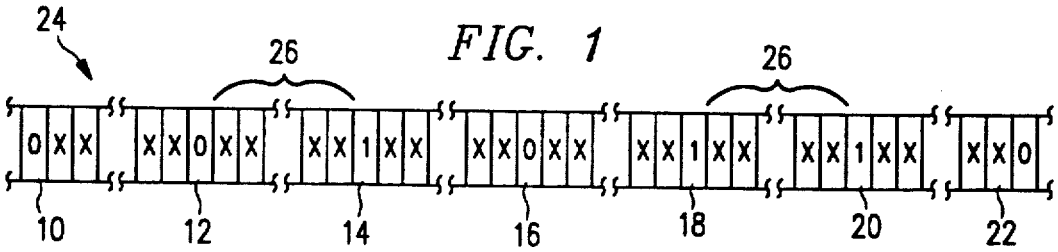
FIG. 1 is a diagram of a serial bit stream showing the framing bit positions under the ESF standard.

Turning now to the drawings, the location of the framing bits 10, 12, 14, 16, 18, 20 and 22 embedded in a serial bit stream 24 according to the ESF standard is shown diagrammatically in FIG. 1. Framing bits 10, 12, 14, 16, 18 and 20 form the pattern of 001011. This pattern is then repeated with framing bit 22 being the first framing bit of the next framing bit pattern. Between each of the framing bits 10–22 are 771 data bits represented by element number 26. Thus a framing bit occurs once and only once in each group of 772 successive bits of serial data. While the ESF standard is being used in this discussion, it will be appreciated that other standards which use framing bits embedded in a serial data stream are also applicable to the present invention.

Figure 2:
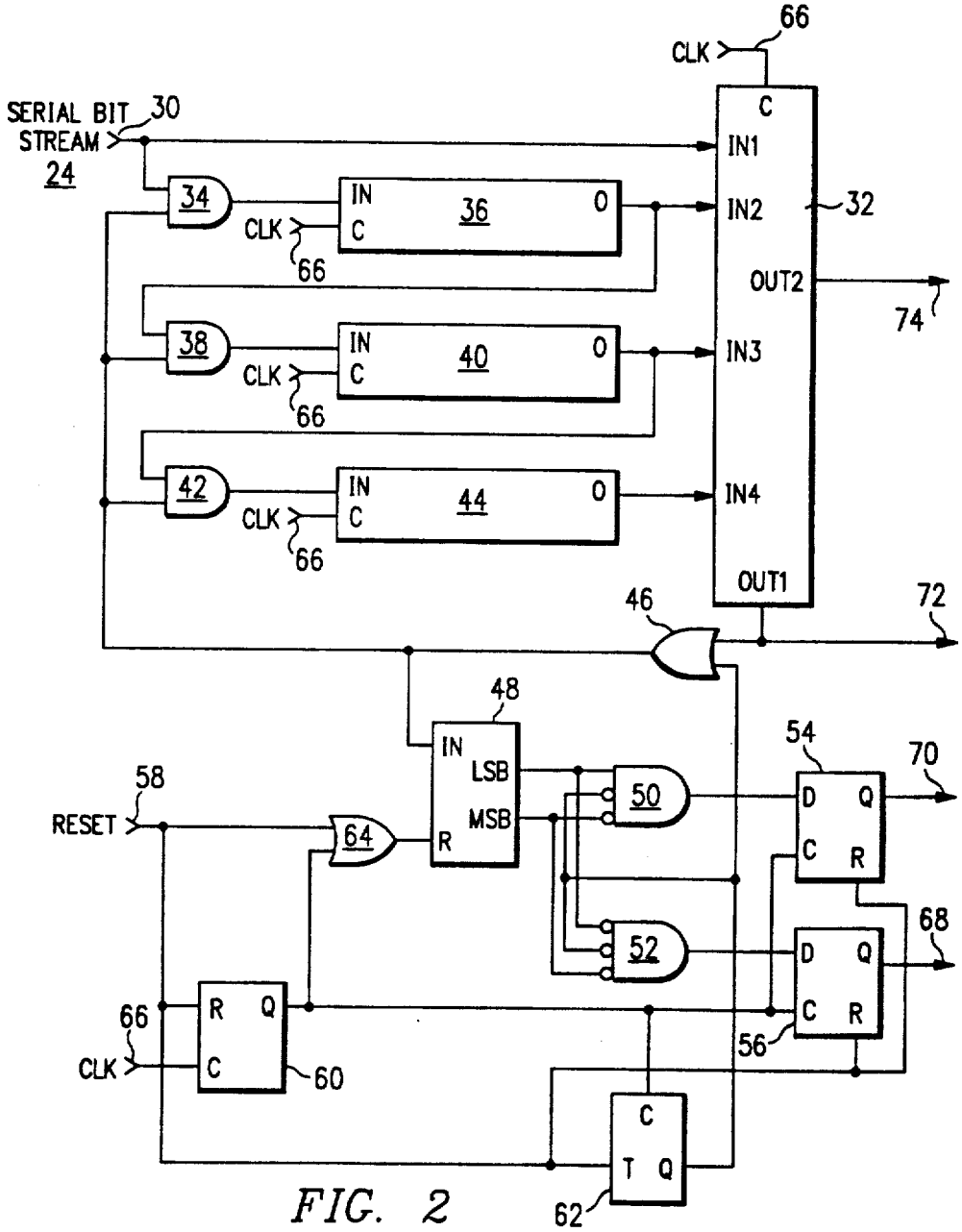
FIG. 2 is a block diagram of a circuit for locating the position of the framing bits embedded in the serial bit stream of FIG. 1 according to the present invention.

A circuit for locating the position of the framing bits embedded in the serial bit stream 24 of FIG. 1 is shown in FIG. 2. The serial bit stream 24 is received at an input terminal 30 which in turn is connected to a first input IN1 of a decoder circuit 32. Input terminal 30 is also connected to one input of a first AND gate 34, the output of which is connected to an input terminal IN of a first shift register 36. An output terminal O of shift register 36 is connected to a second input terminal IN2 of the decoder circuit 32. The O output terminal of shift register 36 is also connected to one input of a second AND gate 38, the output of which is connected to an input terminal IN of a second shift register 40. An output terminal O of shift register 40 is connected to a third input terminal IN3 of the decoder circuit 32. The output terminal O of shift register 40 is also connected to one input of a third AND gate 42, the output of which is connected to an input terminal IN of a third shift register 44. An output terminal O of shift register 44 is connected to a fourth input terminal IN4 of the decoder circuit 32. Each of the shift register 36, 40 and 44 is 772 bits long.

A first output terminal OUT1 of the decoder circuit 32 is connected to a first input of an OR gate 46, the output of which is connected to the second input terminals of AND gates 34, 38 and 42, and also to an input terminal IN of a noncycling counter circuit 48. A LSB output terminal of the noncycling counter 48 is connected to one input of another AND gate 50 and to an inverting input of still another AND gate 52. A MSB output of the noncycling counter 48 is connected to an inverting input of the AND gate 50 and also to an inverting input of the AND gate 52. The output of the AND gate 50 is connected to a D input of a latch circuit 54. The output of the AND gate 52 is connected to a D input of another latch circuit 56.

The circuit of FIG. 2 has a reset input terminal 58 for receiving a reset signal. The reset input terminal 58 is connected to an input R of a cycling counter 60 and to an input T of a clocked delay circuit 62, and to R inputs of the latch circuits 54 and 56. The reset input terminal 58 is also connected to one input of an OR gate 64, the output of which is connected to an R input of the noncycling counter 48. An output Q of the cycling counter 60 is connected to a second input of the OR gate 64, to a C input of the clocked delay circuit 62, and to C inputs of the latch circuits 54 and 56. A Q input of the clocked delay circuit 62 is connected to a second input of the OR gate 46 and to inverting inputs of AND gates 50 and 52.

The circuit of FIG. 2 also has an input for receiving a clock signal CLK at node 66. The clock signal at node 66 is connected to C input terminals of the decoder circuit 32, the cycling counter 60, and the shift registers 36, 40 and 44. The clock signal CLK is derived from the serial bit stream by circuitry not shown in FIG. 2, but known in the art, and provides a clock signal coincident with the arrival of each bit of the serial bit stream 24 at the input terminal 30.

An output Q of the latch circuit 56 is connected to an output terminal 68. An output Q of the latch circuit 54 is connected to a second output terminal 70. The output OUT1 of decoder circuit 32 is also connected to a third output terminal 72. An output OUT2 of the decoder circuit 32 is connected to a fourth output terminal 74.

The circuit of FIG. 2 in accordance with the present invention locates the position of the embedded framing bits of a serial bit stream at input terminal 30 and thereby enables a receiver (of which the circuit of FIG. 2 is a part) to become synchronized with the serial bit stream. This process is performed in the following manner.

At the beginning of the synchronization process, shift registers 36, 40 and 44 are allowed to become filled with unaltered portions of the serial bit stream 24 which passes through the input terminal 30. This is accomplished by applying a reset signal to the reset input terminal 58. Upon receipt of the reset signal at its T input, the clocked delay circuit 62 provides a logical 1 at its Q output until three clock signals have been received at the C input of the clocked delay circuit 62. This logical 1 level causes the output of OR gate 46 to go to a logical 1 level which in turn causes the AND gates 34, 38 and 42 to pass the logic levels at their inputs to the inputs of the shift registers 36, 40 and 44 respectively. The signal to the C input of the clocked delay circuit 62 is provided by the Q output of the cycling counter 60, which produces one clock signal at its Q output for every 772 clock signals it receives at its C input i.e., from CLK at terminal 66. In other words, the cycling counter 60 puts out a pulse after it has counted 772 CLK signals corresponding to the arrival of 772 bits of the serial bit stream 24 at the input terminal 30. The clocked delay circuit 62 in turn provides a logical 1 level at its Q output until the C input of the clocked delay circuit 62 has received three clock signals from the cycling counter 60 for a total time equivalent to the arrival of 2316 bits of the serial bit stream 24 at the input terminal 30. Thus, when the Q output of the clocked delay circuit 62 returns to the logical 0 level after a reset operation, the shift registers 36, 40 and 44 will contain unaltered portions of the serial bit stream 24 except for the last bit of shift register 44 which will become filled with a bit of the serial bit stream 24 upon the arrival of the next bit of the serial bit stream 24 at the input terminal 30.

Thereafter, as each bit of the serial bit stream is received at input terminal 30, such bit is combined with the digital signals appearing at inputs IN2, IN3 and IN4 of decoder circuit 32, and the combination of the inputs IN4, IN3, IN2 and IN1 are decoded to determine if they match any sequence of two concatenated framing bit sequences. If a match is found, the output OUT1 of decoder 32 is set to a logical 1, and the bits of the serial bit stream 24 present at the inputs of AND gates 34, 38 and 42 are passed unaltered to the IN inputs of the shift registers 36, 40 and 44 respectively. But if a match is not found, the output OUT1 is set to a logical 0. The output of the OR gate 46 also becomes a logical 0, causing the AND gates 34, 38 and 42 to provide a logical 0 to each of the IN inputs of the shift registers 36, 40 and 44 respectively, thereby placing altered portions of the serial bit stream 24 into the shift registers 36, 40 and 44. For example if the serial bit stream at input terminal 30 is configured according to the ESF standard as shown in FIG. 1 (with the framing bit sequence 001011), then the decoder circuit 32 will find a match if the digital signals at inputs IN4, IN3, IN2 and IN1 respectively are 0010, 0101, 1011, 0110, 1100 or 1001. These combinations are the six possible sequences of four bits formed by concatenated two framing bit patterns (i.e., 001011001011).

The noncycling counter 48 counts the number of matches which occur during the receipt of successive 772 bit blocks of the serial bit stream 24 at the input terminal 30. The noncycling counter 48 is set to a zero count (LSB output=MSB output=0) when it is reset by a reset signal at its R input, and then increments to a one count (LSB output=1, MSB output=0) when the first match is detected after the reset, increments to a two count (LSB output=0, MSB output=1) when the second match is detected after a reset, and increments to a three count (LSB output=MSB output=1) when the third match is detected after a reset. However, further matches after the third count do not change the state of the LSB and MSB outputs of the noncycling counter 48. Stated another way, the noncycling counter 48 is set to a zero count by a reset signal at its R input and then counts the number of matches which occur through the third match, but then stops counting until another reset signal is received. If the noncycling counter 48 has a count of one after a block of 772 bits, then the location of the framing bit pattern has been uniquely located, and the bit present at input terminal 30 when the next match occurs will be a bit of the framing bit pattern. If the noncycling counter 48 is zero at the end of a block of 772 bits, then the shift registers 36, 40 and 44 need to be refilled with unaltered portions of the serial bit stream 24. If the noncycling counter 48 is greater than one at the end of a block of 772 bits, then the synchronization process continues with the bits of the serial bit stream, both altered or unaltered, present in the shift registers 36, 40 and 44.

Circuitry for performing the match test function of the decoder circuit 32 are well known in the art and are omitted from FIG. 2 for simplicity. For example, the circuitry for performing the match test could consist of six AND gates having non-inverting and inverting inputs as appropriate to test for the six patterns set forth in the previous paragraph. The outputs of the six AND gates could be inputted to a six-input OR gate and the output of the OR gate could be gated with the clock pulse from the C input to produce the OUT1 output of the decoder circuit 32.

As heretofore mentioned, each of the shift registers 36, 40 and 44 is 772 bits long in the preferred embodiment. Since the outputs of each of the AND gates 34, 38 and 42 are connected to the IN inputs of shift registers 36, 40 and 44 respectively, each of the AND gate-shift, register combinations 34–36, 38–40 and 42–44 can be regarded as logic-storage circuits. The outputs from the three shift registers 36, 40 and 44 together with the most recent bit of the serial bit stream appearing at input terminal 30 form inputs IN1, IN2, IN3 and IN4 to the decoder circuit 32; these inputs provide samples of the serial bit stream 24 (either altered or unaltered) at bit intervals corresponding to the bit intervals of the framing bit pattern 10, 12, 14, 16, 18 and 20 embedded in the serial bit stream 24.

The circuit of FIG. 2 operates by detecting if a match occurs in the decoder circuit 32. If a match occurs, then the bit at the input terminal 30 and the three bits separated from the bit at the input terminal 30 by multiples of 772 may be part of the framing bit pattern. However if a match does not occur, then the bit at the input terminal 30 and the three bits separated from the bit at the input terminal 30 by multiples of 772 are not part of the framing bit pattern and are set to all logical 0's. When another 772 bits of the serial bit stream have passed through the input terminal 30, then the IN1, IN2, IN3 and IN4 inputs to the decoder circuit 32 will be X000 respectively, where X represents the logic level of the bit presently at the input terminal 30. Advantageously, the framing bit pattern according to the ESF standard of FIG. 1 does not have three 0's in succession; therefore, regardless of what the logic level is of the bit at the input terminal 30, the decoder circuit 32 will not find a match, and the AND gate 34 will cause bit X at the input terminal 30 to be stored in the shift register 36 as a logical 0. In this manner, the circuit of FIG. 2 will continue to not find matches for every incoming bit of the serial bit stream 24 which is a multiple of 772 bits from any previous non-match. Every bit in each block of 772 bits is eventually determined not to be a match except for the true framing bit.

It will be understood that the term "altered" for purposes of this discussion means set to a predefined logical level even if the bit was already at that logical level. For example, the AND gates 34, 38 and 42 set the IN inputs of the shift registers 36, 40 and 44 to a logical 0 level in the preferred embodiment when a match is not detected and thus "alters" the data even if some of the individual bits were already at a logical 0 level.

To determine when there has only been one match in a block of 772 bits of the serial bit stream 24, counter circuit 48 counts the number of logical 1's at the output of the OR gate 46. The noncycling counter 48 counts up from zero to three, but does not count above three or cycle back to zero. The zero state can be set only by resetting the counter with a logical 1 level applied to the input terminal R of the noncycling counter 48. The noncycling counter 48 is reset either by a reset command at reset terminal 58 or by a logical 1 signal from the Q output of the cycling counter 60. This OR function occurs in OR gate 64. The LSB output of the noncycling counter 48 is connected to the noninverting input of the AND gate 50, while the MSB output of the noncycling counter 48 is connected to an inverting input of the AND gate 50. Accordingly, a count of one by the noncycling counter 48 causes a logical 1 signal to be produced at the output of AND gate 50 (assuming the circuit of FIG. 2 is not in a reset cycle with the Q output of the clocked delay circuit 62 at a logical 1) and to be applied to the input D of the latch 54; whereas a count of zero, two or three causes a logical 0 to be applied to the D input of latch 54.

As discussed previously, the cycling counter 60 counts through 772 states and produces a logical 1 signal at its output terminal Q at the 772nd count. This Q output is used to reset the noncycling counter 48 and also to transfer the state at the D inputs to the Q outputs of the latch circuits 54 and 56 each time the cycling counter 60 reaches a count of 772. This operation of the cycling counter in conjunction with the noncycling counter 48 determines the number of matches in the decoder circuit 32 for each successive block of 772 bits of the serial bit stream 24; and, if the number matches is only one, then the Q output of the latch 54 is set to a logical 1, thereby indicating that the location of the framing bits within the serial bit stream 24 has been determined.

Once the location of the framing bit pattern has been determined (by the presence of a logical 1 at the output terminal 70), then the location of the first logical 0 of the framing bit pattern 001011 is determined by logically ANDing together the output OUT1 of the decoder circuit 32 (output terminal 74) with the OUT2 output of the decoder circuit 32 (output terminal 72). Output OUT2 of the decoder circuit 32 provides a logical 1 output when the inputs IN4, IN3, IN2 and IN1 are 0010. A logical 1 at the output terminal 72 indicates that the bit of the serial bit stream 24 presently at input terminal 30 is a framing bit, and a logical 1 at the output terminal 74 indicates that if the bit at input terminal 30 is a framing bit, it is the first bit of the framing bit sequence 001011.

If the noncycling counter 48 is at the zero count (LSB and MSB outputs at a logical 0) and the Q output of the clocked delay circuit 62 is at a logical 0 (not a reset operation), then the output of the AND gate 52 will be a logical 1. If the Q output of the cycling counter 60 is at a logical 1 when the output of the AND gate 52 is a logical 1, then the logical 1 state will be transferred to the output terminal 68 by the latch circuit 56. This condition can only occur if a match has not occurred during the receipt of a block 772 bits of the serial bit stream 24, meaning that the location of the framing bit pattern has been lost. If this occurs, then the circuit must be reset (by circuitry not shown in FIG. 2) by applying a reset signal to the reset input terminal 58 in order to fill the shift registers 36, 40 and 44 with unaltered portions of the serial bit stream 24.

An advantage of the synchronization circuit of FIG. 2 is the use of only three shift registers of 772 bits each. Thus, by comparison to the use of more registers there is an advantageous savings of circuit area if the circuit is embodied in an integrated circuit. Moreover, the circuit of FIG. 2 performs the synchronization operation in approximately six to eight milliseconds compared to approximately 50 milliseconds or more required for some prior art circuits.

While the description above has been with respect to the ESF standard, it will be understood that the present invention is also applicable to other bit framing patterns differing in length and composition from the ESF standard. The present invention is also applicable to serial bit streams which have other than 772 data bits separating the framing bits and other than six framing bits in the framing bit pattern. If other than six framing bits are used in the pattern, or if the framing bit pattern is different from the ESF standard, the minimum number of shift registers required to locate the framing sequence can be determined by finding the minimum number of bits required to find a pattern to be written into the serial registers which will produce a nonmatch no matter which bit arrives N bits later, where N is the pitch of the framing bit pattern. Also, the present invention is applicable to framing bit patterns which use framing packets of two or more bits in succession rather than a single framing bit separated by data bits as in the ESF standard.

Although the invention has been described in part by making detailed reference to a certain specific embodiment, such detail is intended to be and will be understood to be instructional rather than restrictive. It will be appreciated by those skilled in the art that many variations may be made in the structure and mode of operation without departing from the spirit and scope of the invention, as disclosed in the teachings contained herein. For example, instead of determining whether or not the framing pattern has been located by counting the number of logical 1 bits produced at the output of the OR gate 46 for each 772-bit block of bits of the serial bit stream, a timer could be used to time from the last reset pulse for a predetermined time interval which is sufficiently long to guarantee that only one match will occur in each block of 772 bits of the serial bit stream.

What is claimed is:

1. A method for locating the position of a framing pattern in a serial bit stream, wherein each of said framing bits is separated by $P-1$ bits of data, comprising the steps of:

(a) after the arrival of $\{(M-1)\times P\}+1$ bits of said serial bit stream at an input terminal, taking M samples $P_1, P_2, \ldots P_M$ of said serial bit stream, where $P_1$ is the last bit of said serial bit stream to have arrived at said input terminal, $P_2$ is the bit of said serial bit stream which arrived P bits prior to said $P_1$ bit, and $P_M$ is the bit which arrived $(M-1)\times P$ bits prior to said $P_1$ bit;

(b) determining if the bit pattern sequence $P_M \ldots P_1$ matches any M-bit sequence of the bit pattern formed by concatenating two of said framing patterns;

(c) if a match does not occur, changing said $P_1, P_2, \ldots P_{M-1}$ bit sample to a bit pattern such that the combination of the logic bit X, where logic bit X can be either a logical 1 or a logical 0, and the changed $P_1, P_2, \ldots P_{M-1}$ bits would not match any sequence of the bit pattern formed by concatenating two of said framing patterns, and if a match does occur, leaving the bits of said serial bit stream unaffected;

(d) upon arrival of the next bit of said serial bit stream at said input terminal, taking M samples $P_1, P_2, \ldots P_M$, where $P_1$ is the last bit of said serial bit stream to have arrived at said input terminal, $P_2$ is the bit of said serial bit stream which arrived P bits prior to said $P_1$ bit unless said $P_2$ bit, when it was in the $P_1$ position, was previously changed by the process of step (c), and $P_M$ is the bit which arrived $M-1\times P$ bits prior to said $P_1$ bit unless said $P_M$ bit, when it was in the $P_1, P_2, \ldots P_{M-2}$ or $P_{M-1}$ position, was previously changed by the process of step (c);

(e) repeating steps (b) through (d) while counting the number of matches which occur during the arrival of each successive block of said serial bit stream, each block equal to P bits in length; and (f) repeating steps (a) through (e) if said count at the end of any of said blocks is zero, and having identified the position of said framing bits if said count at the end of any said blocks is one.

2. A method for locating the position of the framing pattern in a T1 serial bit stream encoded according to the ESF standard comprising the steps of:

(a) upon the arrival of a bit of said serial bit stream at an input terminal, taking 4 samples $P_1, P_2, P_3$ and $P_4$ of said serial bit stream, where $P_1$ is the last bit to have arrived, $P_2$ is the bit of said serial bit stream which arrived 772 bits prior to said $P_1$ bit, $P_3$ is the bit of said serial bit stream which arrived 772 bits prior to said $P_2$ bit, and $P_4$ is the bit which arrived 772 bits prior to said $P_3$ bit;

(b) determining if the bit pattern sequence $P_4, P_3, P_2$ and $P_1$ matches the any of the bit sequences, 0010, 0101, 1011, 0110, 1100, and 1001;

(c) if a match does not occur, then changing said $P_1$, $P_2$, and $P_3$ bits to a first logic state, and if a match does occur, leaving the bits of said serial bit stream unaffected;

(d) upon arrival of the next bit of said serial bit stream at said input terminal, taking 4 samples $P_1, P_2, P_3$ and $P_4$, where $P_1$ is the last bit of said serial bit stream to have arrived at said input terminal, $P_2$ is the bit of said serial bit stream which arrived P bits prior to said $P_1$ bit unless said $P_2$ bit, when it was in the $P_1$ position, was previously changed by the process of step (c), $P_3$ is the bit which arrived 1,544 bits prior to said $P_1$ bit unless said $P_3$ bit, when it was in the $P_1$ or $P_2$ position, was previously changed by the process of step (c), and $P_4$ is the bit which arrived 2,316 bits prior to said $P_1$ bit unless said $P_4$ bit, when it was in the $P_1, P_2$, or $P_3$ position, was previously changed by the process of step (c);

(e) repeating steps (b) through (d) while counting the number of matches which occur during the arrival of successive blocks of said serial bit stream, each block equal to 772 bits in length; and (f) repeating steps (a) through (e) if said count at the end of any of said blocks is zero, and having identified the position of said framing bits if said count at the end of any of said blocks is one.

3. Apparatus for locating the position of a bit framing pattern in a serial bit stream wherein each of said framing bits is separated by $P-1$ bits of data comprising:

(a) a serial data input terminal for receiving said serial bit stream;

(b) K logic-storage means, each having an input terminal and an output terminal where said input terminal of said first logic-storage means is coupled to said serial data input terminal, said input terminal of said second logic-storage means is coupled to said output terminal of said first logic-storage means, and said rest of said remaining K logic-storage means are similarly connected to form a series circuit in which said Kth logic-storage means is the last circuit of said series circuit, each of said K logic-storage means including means for receiving a logic signal at said input terminal and either setting said logic signal to a first or second logic state or leaving said logic signal unaltered in response to a comparator output signal, for storing said altered or unaltered logic signal sequentially in P storage locations in synchronization with the rate of arrival of said serial bit stream at said serial data input terminal, and for providing at said output terminal the Pth prior altered or unaltered logic signal;

(c) comparison means coupled to said serial data input terminal and to said output terminals of said K logic-storage means for determining if the bit of said serial bit stream present at said input terminal in combination with said altered or unaltered logic signals at said output terminals of said first, second, . . . Kth logic-storage means respectively match any $(K+1)$-bit sequences of the pattern formed by concatenating two of said framing bit patterns and for providing said comparison output signal at an output terminal indicating if a match has occurred or not, said K logic-storage means responding to said comparison output signal by setting each of said logic signals to said first or second logic state such that the combination of a logic bit X, where logic bit X can be either a logical 1 or a logical 0, and said altered logic signals of said first, second, . . . and Kth logic-storage means respectively would not match any sequence of the bit pattern formed by concatenating two of said framing patterns if a match does not occur, and if a match does occur, leaving unaffected said logic signals of said K logic-storage means; and (d) counting means for counting the number of matches which occur during successive blocks of said serial bit stream which arrive at said data input terminal, each of said blocks being P bits in length.

4. Apparatus for locating the position of the framing bits in a serial bit streams formed according to the ESF standard comprising:

(a) an input terminal for receiving said serial bit stream;

(b) a first, second and third logic-storage means, each having an input terminal and an output terminal where said input terminal of said first logic-storage means is coupled to said serial data input terminal, said input terminal of said second logic-storage means is coupled to said output terminal of said first logic-storage means, and said input terminal of said third logic-storage means is coupled to said output terminal of said second logic-storage means, each of said logic-storage means including means for receiving a logic signal at said input terminal and either setting said logic to a first logic state or leaving said logic signal unaltered in response to a comparator output signal, for storing said altered or unaltered logic signal sequentially in 772 storage locations in synchronization with the rate of arrival of said serial bit stream at said serial data input terminal, and for providing at said output terminal the 772nd prior altered or unaltered logic signal;

(c) comparison means coupled to said serial data input terminal and to said output terminals of said first, second and third logic-storage means for determining if the bit of said serial bit stream present at said input terminal in combination with said altered or unaltered logic signals at said output terminals of said third, second and first logic-storage means respectively match any of the bit patterns 0010, 0101, 1011, 0110, 1100 and 1001 and for providing said comparator output signal at any output terminal indicating if a match has occurred or not, said first, second and third logic-storage means responding to said comparator output signal by setting each of said logic signals to said first logic stated if a match does not occur, and if a match does occur, leaving unaffected said logic signals of said logic-storage means; and (d) counting means for counting the number of matches which occur during successive blocks of said serial bit stream which arrive at said data input terminal, each of said blocks being 772 bits in length.

*5. A method for acquiring the framing clock of a data stream, which is formatted in frames according to a protocol wherein a predetermined bit framing pattern is embedded in the data stream, comprising the steps of:*

*a) carrying successive bits of the data stream in serial memory;*

*b) successively comparing sets of plural bits, at separations within said serial memory such that each said set of bits corresponds to a single respective bit position with respect to said frame formatting of said predetermined protocol, to ascertain whether each said set constitutes a portion of said bit framing pattern, and accordingly, for each said set:*

*if the bits of said set could not constitute a portion of said bit framing pattern, overwriting said bits of said respective set with a pattern which assures that the next succeeding test of a bit set at said bit position will also not detect a portion of said framing pattern:*

*c) and repeating said step (b), until said comparing step has detected, at all but one of the bit positions which are possible within said protocol, that the bit set at said bit position is not part of said framing pattern.*

*6. A circuit for locating the position of framing bits embedded in a serial bit stream, which is formatted in frames according to a protocol wherein a predetermined bit framing pattern is embedded in the data stream, comprising:*

*at least three shift registers, having respective lengths corresponding to a separation of bits of said framing pattern within said bit stream;*

*a decoder, connected to receive and test the respective outputs of said shift registers, together with an incoming bit, to detect a match with said framing pattern;*

*a plurality of logic gates, wherein said shift registers are serially connected together through said logic gates, and said logic gates are controlled by the output of said decoder circuit so that;*

*if said decoder indicates that a match has been detected, then the incoming bit is loaded into the input of a first one of said shift registers by said logic gates, and*

*the output of said first one of said shift registers is connected to the input of a second one of said shift registers by said logic gates, and*

*the output of said second one of said shift registers is connected to the input of a third one of said shift registers by said logic gates; and*

*if said decoder indicates that a match has NOT been detected, then*

*a predetermined sequence of bit values, which is not a portion of said framing pattern, is loaded into said first, second, and third shift registers by said logic gates.*

*7. The circuit of claim 6, further comprising a counter, connected to count the number of matches detected by said decoder during a number of bits corresponding to a separation of bits of said framing pattern within said bit stream, and to indicate, if and only if said number of matches is one, that the location of the framing bits within the serial bit stream has been determined.*

*8. The circuit of claim 6, further comprising: a noncycling counter, connected to count the number of matches detected by said decoder; and a cycling counter, connected to reset said noncycling counter at intervals corresponding to a separation of bits of said framing pattern within said bit stream; the output of said noncycling counter being connected to indicate, if and only if said number of matches detected by said noncycling counter is one, that the location of the framing bits within the serial bit stream has been determined.*

*9. The circuit of claim 6, wherein said predetermined sequence of bit values is three identical values.*

*10. The circuit of claim 6, wherein said predetermined sequence of bit values is 000.*

*11. The method of claim 5, wherein said protocol is compatible with the T1 protocol.*

*12. The circuit of claim 6, wherein said protocol is compatible with the T1 protocol.*

*13. The method of claim 5, wherein said bit framing pattern does not contain any sequence of three zeros, and*

*wherein said pattern used in said overwriting step is all zeros.*

*14. The circuit of claim 6, wherein said bit framing pattern does not contain any sequence of three zeros, and wherein said predetermined sequence of bit values is all zeros.*

*15. The method of claim 5, wherein said protocol is compatible with the Enhanced Superframe Format (ESF) standard.*

*16. The circuit of claim 6, wherein said protocol is compatible with the Enhanced Superframe Format (ESF) standard.*

*17. The method of claim 5, wherein said sets of bits compared by said step (b) are shorter than the predetermined bit framing pattern of said protocol.*

*18. The circuit of claim 6, wherein said decoder is connected to test sets of bits which are shorter than the predetermined bit framing pattern of said protocol.*

*19. The method of claim 5, wherein said sets of bits compared by said step (b) are exactly two bits shorter than the predetermined bit framing pattern of said protocol.*

*20. The circuit of claim 6, wherein said decoder is connected to test sets of bits which are exactly two bits shorter than the predetermined bit framing pattern of said protocol.*

*21. The method of claim 5, wherein said step (a) of carrying uses a serial memory which includes multiple shift registers connected together in succession, successive ones of said shift registers being interconnected through a logic gate which selectively performs said overwriting during data transfers between successive ones of said shift registers.*

*22. The method of claim 5, wherein said step (a) of conveying uses a serial memory which is implemented as multiple shift registers connected together in succession.*

* * * * *

UNITED STATES PATENT AND TRADEMARK OFFICE

CERTIFICATE OF CORRECTION

PATENT NO. : RE: 34,241

DATED : May 4, 1993

INVENTOR(S) : Ching-Lin Jiang

It is certified that error appears in the above-indentified patent and that said Letters Patent is hereby corrected as shown below:

Column 10, line 7, please change "P" to --772 --.

Signed and Sealed this

Fourteenth Day of June, 1994

Bruce Lehman

*Attest:*

BRUCE LEHMAN

*Attesting Officer*

*Commissioner of Patents and Trademarks*